United States Patent Office 3,547,933
Patented Dec. 15, 1970

3,547,933
6 - AMINO - 1,1a,6,10b - TETRAHYDRODIBENZO
[a,e]CYCLOPROPA[c] - CYCLOHEPTEN - 6 - OLS
AND ESTERS THEREOF
William E. Coyne and John W. Cusic, Skokie, Ill., assignors to G. D. Searle & Co., Chicago, Ill., a corporation of Delaware
No Drawing. Continuation-in-part of application Ser. No. 733,261, May 31, 1968. This application June 28, 1968, Ser. No. 740,978
Int. Cl. C07d 29/16
U.S. Cl. 260—294.7
6 Claims

ABSTRACT OF THE DISCLOSURE

Tetrahydrodibenzo[a,e]cyclopropa[c]cyclohepten-6-ols and the corresponding esters, with an aminoalkyl substituent at the 6-position, are described herein. For the preparation of these compounds, a tetrahydrodibenzo[a,e]cyclopropa[c]cyclohepten-6-one is reacted with an aminoalkyl Grignard reagent to give the desired alcohols which can then be esterified with an appropriate acid chloride or acid anhydride. The compounds involved are useful as diuretic agents and they are also anti-bacterial, anti-protozoal, and anti-algal agents.

SUMMARY OF THE INVENTION

The present application is a continuation-in-part of application Ser. No. 733,261, filed May 31, 1968.

The present invention relates to derivatives of 1,1a,6,10b - tetrahydrodibenzo[a,e]cyclopropa[c]cyclohepten-6-ols. The structure and the numbering of the ring system involved is as follows

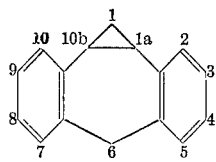

In particular, the present invention relates to compounds having the following general formula

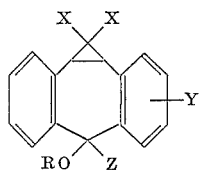

wherein X is selected from the group consisting of hydrogen and halogen; Y is selected from the group consisting of hydrogen and halogen; R is selected from the group consisting of hydrogen and lower alkanoyl; and Z is selected from the group consisting of 1-methyl-4-piperidyl and —Alk—NR'R" wherein Alk is lower alkylene and —NR'R" is selected from the group consisting of di(lower alkyl)amino, 1-pyrrolidinyl, piperidino, and 4-methyl-1-piperazinyl.

The halogen atoms referred to above include fluorine, chlorine, bromine, and iodine; the lower alkylene radicals referred to above contain up to 6 carbon atoms and can be exemplified by radicals such as ethylene, propylene, and trimethylene. The lower alkyl radicals referred to above likewise contain up to 6 carbon atoms and can be exemplified by radicals such as methyl, ethyl, propyl, isopropyl, and butyl. The lower alkanoyl radicals referred to above also contain up to 6 carbon atoms and can be exemplified by radicals such as acetyl, propionyl, and butyryl.

The organic bases of this invention form pharmaceutically acceptable salts with a variety of inorganic and strong organic acids. Such sales are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of the present invention are prepared by the reaction of a carbene, preferably dichlorocarbene, with a dibenzocycloheptenone of the formula

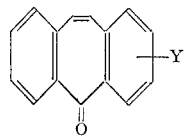

wherein Y is defined as above. The dichlorocarbene is preferably obtained by the reaction of sodium methoxide with ethyl trichloroacetate. The indicated reaction gives a 1,1-dichloro-1,1a,6,10b-tetrahydrodibenzo[a,e]cyclopropa[c]cyclohepten-6-one. Reduction of this ketone can be carried out either selectively to reduce only the carbonyl group or it can be carried out non-selectively to reduce the ketone to the alcohol and reduce off the chlorine substituents at the same time. In the first instance, a hydride reducing agent such as sodium borohydride can be used while in the latter instance, the reducing agent is lithium and t-butyl alcohol. Where selective reduction is used, the resulting dichloro alcohol can be further reacted with lithium and t-butyl alcohol to reduce off the two halogen atoms. Actually, this two step procedure is the preferred method for obtaining the tetracyclic alcohol without the chlorine atoms substituted at the 1-position. The tetracyclic alcohol can then be oxidized with an agent such as chromium trioxide to give the corresponding tetracyclic ketone.

Reaction of the above ketones with the appropriate aminoalkyl Grignard reagent gives the desired tetrahydrodibenzo[a,e]cyclopropa[c]cyclohepten - 6 - ols having an aminoalkyl substituent at the 6-position. Reaction of this type of alcohol with an anhydride such as acetic anhydride or with an acid chloride gives the corresponding compound in which the hydroxy group has been acylated.

The compounds of the present invention are useful because of their pharmacological properties. In particular, the present compounds possess diuretic activity. This diuretic activity is determined by a modification of the method of Lipschitz et al., J. Pharmacol. Exper. Therap., 79, 97 (1943). Intact male Badger rats (275–400 grams) are dosed orally with 25 ml./kg. of 0.86% aqueous sodium chloride containing a standard dose (0.6 mg./kg.) of hydrochlorothiazide, the reference standard. Other groups of 10 animals are treated orally with the test compound dissolved or suspended in the saline load at a dose of 24 mg./kg. The animals are placed in metabolism cages (2 per cage) and pooled samples of urine from each group representing a given treatment are collected after 5 hours. The pooled samples are measured for total volume and sodium. Potency is then determined on the basis of the dose of hydrochlorothiazide which produces equivalent degrees of diuresis with respect to urine volume and sodium output. Thus, in this test, 6-acetoxy-6-(3-dimethylaminopropyl) - 1,1a,6,10b - tetrahydrodibenzo[a,e]cyclopropa[c]cycloheptene (oxalate) was found to be active as a diuretic agent at 24 mg./kg.

The present compounds have also been found to inhibit germination of seeds of Trifolium. In addition, they possess anti-biotic activity against a variety of organisms. Thus, they inhibit the growth of bacteria such as *Diplococcus pneumoniae*, protoza such as *Tetrahymena gelleii*, and algae such as *Chlorella vulgaris*. The present compounds can thus be combined with various known excipients and adjuvants in the form of dusts, solutions, suspensions, ointments, and sprays to provide compositions useful for disinfecting purposes.

The following examples are presented to further illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1

To a stirred solution of 60 parts of 5H-dibenzo[a,d]cyclohepten-5-one in 880 parts of benzene and 200 parts by volume of hexane at 0–5° C. is added 60 parts of sodium methoxide followed by the portionwise addition of 200 parts of ethyl trichloroacetate over a period of 1 hour. The resulting suspension is stirred at 0–5° C. for 5 hours and then allowed to come to room temperature over a period of 18 hours. 200 Parts of water is added and the benzene is separated, washed with water and dried over magnesium sulfate. Evaporation of the benzene solvent leaves a residual oil which is dissolved in 240 parts of hot ethanol, treated with charcoal, and filtered. Crystals form almost immediately in the filtrate and these are separated by filtration, washed with ethanol, and dried to give 1,1 - dichloro-1,1a,6,10b-tetrahydrodibenzo[a,e]cyclopropa[c]cyclohepten-6-one melting at about 129–131° C. This compound has the following formula

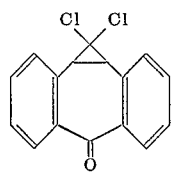

EXAMPLE 2

To a stirred suspension of 10.0 parts of 1,1-dichloro-1,1a,6,10b - tetrahydrodibenzo[a,e]cyclopropa[c]cyclohepten-6-one in 240 parts of methanol is added 3.0 parts of sodium borohydride. The mixture is stirred for 15 minutes at 25° C. and then refluxed for 2 hours before it is poured into 1000 parts of water containing 30 parts of concentrated hydrochloric acid. The solid precipitate which forms is separated by filtration, washed with water, and air dried to give 1,1-dichloro-1,1a,6,10b-tetrahydrodibenzo[a,e]cyclopropa[c]cyclohepten-6-ol melting at about 164–168° C.

EXAMPLE 3

A solution of 30 parts of 1,1-dichloro-1,1a,6,10b-tetrahydrodibenzo[a,e]cyclopropa[c]cyclohepten-6-ol in 270 parts of tetrahydrofluran is prepared and stirred, 2.5 parts of lithium amide is added, and the resulting suspension is stirred for 30 minutes. 12 parts of lithium wire and 9 parts of t-butyl alcohol are added concomitantly over a period of about 1.5 hours. The reaction mixture is cooled from time to time to keep the mixture below reflux temperature. Once the addition is complete, the mixture is stirred for 1 hour and excess lithium is decomposed by the cautious addition of water. The mixture is then further diluted with water and extracted with ether. The combined ether extracts are washed with water and dried over magnesium sulfate. Evaporation of the ether solvent leaves a residual solid which is recrystallized from ethanol to give 1,1a,6,10b-tetrahydrodibenzo[a,e]cyclopropa[c]cyclohepten-6-ol melting at about 142–152° C. This compound has the following formula

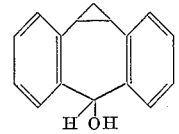

EXAMPLE 4

To a stirred solution of 8.8 parts of 1,1a,6,10b-tetrahydrodibenzo[a,e]cyclopropa[c]cyclohepten-6-ol in 16 parts of acetone is added dropwise 14 parts by volume of Jones reagent (a solution of chromic acid and sulfuric acid in water). The resulting mixture is stirred for an additional 15 minutes and poured into water. It is then extracted with ether and the ether extracts are washed well with water and dried over magnesium sulfate. The solvent is evaporated to leave a crystalline residue. This is recrystallized from ethanol to give 1,1a,6,10b-tetrahydrodibenzo[a,e]cyclopropa[c]cyclohepten - 6 - one melting at about 79–82° C. This compound has the following formula

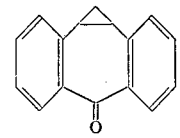

EXAMPLE 5

To a stirred solution of 64.5 parts of 2-chloro-5H-dibenzo[a,d]cyclohepten-6-one in 2650 parts of benzene at 5° C. is added 60 parts of sodium methoxide followed by the portionwise addition of 200 parts of ethyl trichloroacetate over a period of 1 hour. The reaction is stirred at 0–5° C. for 5 hours and then allowed to come to room temperature. 1000 parts of water is added and the benzene layer is separated and washed with water. The solvent is evaporated to leave a residual mixture of crystals and oil. Ethanol is added to this residue and the insoluble material is separated by filtration. The ethanol solution is then cooled and the precipitate which forms is separated by filtration and recrystallized from ethanol to give 1,1,3-trichloro - 1,1a,6,10b - tetrahydrodibenzo[a,e]cyclopropa[c]cyclohepten-6-one melting at about 103–110° C.

EXAMPLE 6

To 2.43 parts of magnesium in a dry flask there is added, with stirring, 9 parts of tetrahydrofuran, 0.5 part of ethyl bromide, and a crystal of iodine, followed by the portionwise addition of a solution of 15 parts of freshly distilled 3-dimethylaminopropyl chloride in 18 parts of tetrahydrofuran. At the end of the addition, almost all of the magnesium has reacted. To this solution is then added a solution of 10 parts of 1,1-dichloro-1,1a,6,10b-tetrahydrodibenzo[a,e]cyclopropa[c]cyclohepten - 6 - one in 90 parts of tetrahydrofuran portionwise. The mixture is refluxed for 2 hours and then poured into 500 parts of water containing 20 parts of ammonium chloride. The solid which forms is separated by filtration and washed with water to give 1,1-dichloro-6-(3-dimethylaminopropyl) - 1,1a,6,10b - tetrahydrodibenzo[a,e]cyclopropa[c]cyclohepten-6-ol melting at about 170–171° C. This compound has the following formula

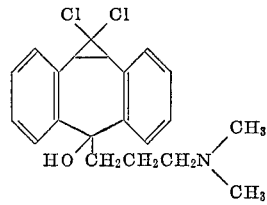

EXAMPLE 7

3-dimethylaminopropylmagnesium chloride is prepared from 2.43 parts of magnesium and 2 parts of 3-dimethylaminopropyl chloride in 27 parts of tetrahydrofuran according to the procedure described in Example 6. To this solution is added, with stirring, a solution of 1.2 parts of 1,1a,6,10b - tetrahydrodibenzo[a,e]cyclopropa[c]cyclohepten-6-one in 18 parts of tetrahydrofuran. The solution is refluxed for 2 hours and then poured into an excess of water containing 5 parts of ammonium chloride. The resulting mixture is extracted with ether and the combined ether extracts are washed with water and dried over potassium carbonate. Evaporation of the solvent leaves a white precipitate which is recrystallized from a mixture of ethanol and hexane to give 6-(3-dimethylaminopropyl) - 1,1a,6,10b - tetrahydrodibenzo[a,e]cyclopropa[c]cyclohepten-6-ol melting at about 134–136° C.

EXAMPLE 8

3-dimethylaminopropylmagnesium chloride is prepared from 12 parts of 3-dimethylaminopropyl chloride according to the procedure described in Example 6. To the resulting tetrahydrofuran solution is added, portionwise, a solution of 11.5 parts of 1,1,3-trichloro-1,1a,6,10b-tetrahydrodibenzo[a,e]cyclopropa[c]cyclohepten - 6 - one in 90 parts of tetrahydrofuran and the resulting solution is refluxed for 2 hours. It is then cooled and poured into an excess of water containing 20 parts of ammonium chloride. A crystalline material forms on standing and this is separated by filtration and recrystallized from ethanol to give 6-(3-dimethylaminopropyl) - 1,1,3 - trichloro - 1,1a,6,10b - tetrahydrodibenzo[a,e]cyclopropa[c]cyclohepten-6-ol melting at about 168–170° C.

EXAMPLE 9

To 2.4 parts of magnesium in a dry flask is added a crystal of iodine and 27 parts of tetrahydrofuran. This mixture is stirred as 1 part of ethyl bromide and then 15 parts of freshly distilled 3-dimethylamino-2-methylpropyl chloride in 27 parts of tetrahydrofuran is added portionwise. After the addition is complete, the mixture is refluxed for 10 minutes and then cooled slightly before 10.0 parts of 1,1-dichloro-1,1a,6,10b-tetrahydrodibenzo[a,e]cyclopropa[c]cyclohepten-6-one in 67 parts of tetrahydrofuran is added portionwise. The mixture is then stirred for 2 hours at reflux before it is cooled and poured into water containing 20 parts of ammonium chloride. The resultant mixture is extracted with ether and the combined ether extracts are washed with water and dried over potassium carbonate. Evaporation of the solvent leaves a yellow oil which is dissolved in ethanol and then mixed with a saturated solution of oxalic acid in ethanol. The precipitate which forms is separated by filtration and recrystallized from ethanol to give 1,1-dichloro-6-(3-dimethylamino - 2 - methylpropyl) 1,1a,6,10b-tetrahydrodibenzo[a,e]cyclopropa[c]cyclohepten-6-ol oxalate melting at about 171–173° C.

EXAMPLE 10

If the procedure of Example 6 is repeated using 3-diethylaminopropyl chloride, 3-piperidinopropyl chloride, and 1-(3-chloropropyl)-4-methylpiperazine in place of the 3-dimethylaminopropyl chloride the products obtained are, respectively, 1,1-dichloro-6-(3-diethylaminopropyl)-1,1a,6,10b-tetrahydrodibenzo[a,e]cyclopropa[c]cyclohepten-6-ol
1,1-dichloro-6-(3-piperinidopropyl)-1,1a,6,10b-tetrahydrodibenzo[a,e,]cyclopropa[c]cyclohepten-6-ol, and
1,1-dichloro-6-[3-(4-methyl-1-piperazinyl)propyl]-1,1a,6,10b-tetrahydrodibenzo[a,e]cyclopropa[c]cyclohepten-6-ol

EXAMPLE 11

A mixture of 2.8 parts of magnesium and 90 parts of tetrahydrofuran is stirred under nitrogen and to this mixture is added a crystal of iodine together with a few drops of methyl iodide. This is followed by the addition of a solution of 11.0 parts of 1-methyl-4-chloropiperidine in 45 parts of tetrahydrofuran. After this addition, the solution is refluxed for 1.5 hours and then cooled to 10° C. Then, a solution of 10.0 parts of 1,1-dichloro-1,1a,6,10b-tetrahydrodibenzo[a,e]cyclopropa[c]cyclohepten - 6 - one in 45 parts of tetrahydrofuran is added portionwise. The mixture is stirred for 1 hour at 25° C. before it is decomposed by the addition of 100 parts by volume of 10% aqueous ammonium chloride solution followed by 100 parts of water. The resulting mixture is extracted with ether and the combined ether extracts are washed with water and dried over potassium carbonate. Evaporation of the solvent leaves an amber oil which is 1,1-dichloro-6 - (1 - methyl-4-piperidyl)-1,1a,6,10b-tetrahydrodibenzo[a,e]cyclopropa[c]cyclohepten-6-ol. This oil is dissolved in a minimum amount of ethanol and mixed with a saturated solution of oxalic acid in ethanol. The precipitate which forms is separated by filtration and then recrystallized from ethanol to give 1,1-dichloro-6-(1-methyl - 4-piperidyl)-1,1a,6,10b-tetrahydrodibenzo[a,e]cyclopropa[c]cyclohepten-6-ol oxalate melting at about 223–224° C. The free base of this compound has the following formula

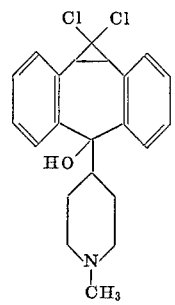

EXAMPLE 12

A solution of 0.5 part of 6-(3-dimethylaminopropyl)-1,1a,6,10b - tetrahydrodibenzo[a,e]cyclopropa[c]cyclo - hepten-6-ol in 10 parts of acetic anhydride is refluxed for 3 hours. The excess anhydride is then removed under reduced pressure and the residue is triturated with aqueous potassium carbonate and ether. The ether layer is then separated and dried over potassium carbonate. The solvent is evaporated to leave a residual oil which is 6-acetoxy - 6 - (3-dimethylaminopropyl)-1,1a,6,10b-tetrahydrodibenzo[a,e]cyclopropa[c]cycloheptene. The oil is dissolved in ethanol and mixed with a saturated solution of excess oxalic acid in ethanol. The precipitate which forms is separated by filtration and recrystallized from ethanol to give 6-acetoxy-6-(3-dimethylaminopropyl)-1,1a,6,10b - tetrahydrodibenzo[a,e]cyclopropa[c]cycloheptene oxalate melting at about 150–153° C. The free base of this compound has the following formula

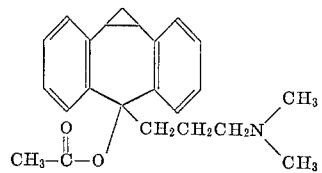

EXAMPLE 13

A solution of 1.0 part of 1,1-dichloro-6-(3-dimethylaminopropyl) - 1,1a,6,10b - tetrahydrodibenzo[a,e]cyclopropa[c]-cyclohepten-6-ol in 20 parts of acetic anhydride is refluxed for 4 hours. Excess acetic anhydride is removed under reduced pressure and the resulting residue is mixed with water and made alkaline with potassium carbonate. This basic mixture is extracted with ether and the combined ether extracts are washed with water and dried over potassium carbonate. The solvent is evaporated to leave a light yellow oil which is dissolved in ethanol and mixed with a saturated ethanol solution of oxalic acid. The precipitate which forms is separated by filtration to give 6 - acetoxy-1,1-dichloro-6-(3-dimethylaminopropyl)-1,1a,6,10b - tetrahydrodibenzo[a,e]cyclopropa[c]cycloheptene oxalate melting at about 234–240° C.

If the above procedure is repeated using propionic anhydride in place of acetic anhydride, the product is 1,1-dichloro - 6 - (3-dimethylaminopropyl)-6-propionyloxy-1,1a,6,10b - tetrahydrodibenzo[a,e]cyclopropa[c]cycloheptene.

The present application is a continuation-in-part of applicants' copending application entitled "Dibenzo[a,e]cyclopropa[c]cycloheptene Derivatives" filed about May 31, 1968.

What is claimed is:
1. A compound of the formula

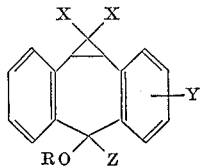

wherein X is selected from the group consisting of hydrogen and chlorine; Y is selected from the group consisting of hydrogen and chlorine; R is selected from the group consisting of hydrogen and lower alkanoyl; and Z is —Alk—NR'R" wherein Alk is lower alkylene; and —NR'R" is selected from the group consisting of di(lower alkyl)amino, piperidino, and 4-methyl-1-piperazinyl.

2. A compound according to claim 1 which is 6-(3-dimethylaminopropyl) - 1,1a,6,10b - tetrahydrodibenzo[a,e]cyclopropa[c]cyclohepten-6-ol.

3. A compound according to claim 1 which is 1,1-dichloro - 6 - (3-dimethylaminopropyl)-1,1a,6,10b-tetrahydrodibenzo[a,e]cyclopropa[c]cyclohepten-6-ol.

4. 1,1 - dichloro - 6-(1-methyl-4-piperidyl)-1-,1a,6,10b-tetrahydrodibenzo[a,e]cyclopropa[c]cyclohepten-6-ol.

5. A compound according to claim 1 which is 6-acetoxy - 6 - (3-dimethylaminopropyl)-1,1a,6,10b-tetrahydrodibenzo[a,e]cyclopropa[c]cycloheptene.

6. A compound according to claim 1 which is 6-acetoxy - 1,1 - dichloro-6-(3-dimethylaminopropyl)-1,1a,6,10b-tetrahydrodibenzo[a,e]cyclopropa[c]cycloheptene.

References Cited

UNITED STATES PATENTS 3,475,438  10/1969  Remy _____ 260—93Az

HENRY R. JILES, Primary Examiner

S. D. WINTERS, Assistant Examiner

U.S. Cl. X.R.

260—268, 294, 294.3, 482, 570.8, 590, 618; 424—267, 250, 330

Disclaimer 3,547,933.—*William E. Coyne* and *John W. Cusic*, Skokie, Ill. 6-AMINO-1, 1a,6,10b - TETRAHYDRODIBENZO[a,e]CYCLOPROPA[c]CYCLOHEPTEN-6-OLS AND ESTERS THEREOF. Patent dated Dec. 15, 1970. Disclaimer filed Feb. 20, 1980, by the assignee, *G. D. Searle & Co.*

Hereby enters this disclaimer to claims 1–6 of said patent.

[*Official Gazette, April 8, 1980.*]